United States Patent
Patwardhan et al.

(10) Patent No.: US 10,592,400 B2
(45) Date of Patent: Mar. 17, 2020

(54) SYSTEM AND METHOD FOR CREATING VARIANTS IN A TEST DATABASE DURING VARIOUS TEST STAGES

(71) Applicant: Tata Consultancy Services Limited, Maharashtra (IN)

(72) Inventors: Nikhil Girish Patwardhan, Maharashtra (IN); Ashim Roy, Maharashtra (IN); Rupali Kedar Kulkarni, Maharashtra (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 156 days.

(21) Appl. No.: 14/251,968

(22) Filed: Apr. 14, 2014

(65) Prior Publication Data
US 2014/0317601 A1    Oct. 23, 2014

(30) Foreign Application Priority Data
Apr. 23, 2013   (IN) ............ 1495/MUM/2013

(51) Int. Cl.
*G06F 11/36* (2006.01)

(52) U.S. Cl.
CPC ...... *G06F 11/3684* (2013.01); *G06F 11/3672* (2013.01)

(58) Field of Classification Search
CPC ......... G06F 17/30309; G06F 17/30371; G06F 17/30575; G06F 17/30595; G06F 2201/80; G06F 8/71
USPC ........................................................ 717/124
See application file for complete search history.

(56) References Cited

U.S. PATENT DOCUMENTS

| | | | |
|---|---|---|---|
| 6,715,108 B1 | 3/2004 | Badger et al. | |
| 8,078,655 B2 | 12/2011 | Grubov et al. | |
| 8,650,167 B2* | 2/2014 | Sim-Tang | G06F 17/3015 707/694 |
| 8,898,201 B1* | 11/2014 | Drost | G06F 17/30079 707/803 |
| 2002/0007363 A1* | 1/2002 | Vaitzblit | G06F 11/1471 |
| 2004/0225645 A1* | 11/2004 | Rowney | G06F 17/30516 |
| 2007/0088766 A1* | 4/2007 | Bodge | G06F 17/30309 |
| 2009/0307277 A1* | 12/2009 | Grubov | G06F 11/1451 |
| 2011/0246546 A1 | 10/2011 | Hughes et al. | |

OTHER PUBLICATIONS

Stack Overflow, "Add version control to existing SQL Server database" Nov. 7, 2012.

* cited by examiner

*Primary Examiner* — Bing Zhao
(74) *Attorney, Agent, or Firm* — Thompson Hine LLP

(57) ABSTRACT

System and methods for creating one or more variants of test data during various test stages are disclosed. The system and methods facilitate a user to create a primary variant for test data and to store the primary variant of the test data in a test data variant repository. Any changes performed in the test database by the user are identified by using a tracking mechanism to store one or more new variants along with a variant number with respect to the changes performed in the test database in response to the user's request. The primary variant and the new variants are accessed by the user to perform a comparative analysis and to modify the test data at any test stage.

14 Claims, 5 Drawing Sheets

SYSTEM AND METHOD FOR CREATING VARIANTS IN A TEST DATABASE DURING VARIOUS TEST STAGES

RELATED APPLICATIONS

This application claims the benefit of Indian patent application No. 1495/MUM/2013, filed Apr. 22, 2013.

TECHNICAL FIELD

The present invention relates to a field of test data variants. More particularly, the present invention relates to creation of variants of test data at various test stages in a test database.

BACKGROUND

In the field of test data management, application testing requires test data. The test data is either created from beginning or retrieved from a production database. The application testing comprises execution of test cases and execution of each of the test case leads to modification in the test data.

During testing, developers or testers (referred to herein collectively as testers) intend to view the changes in data after a test case is executed. This helps testers verify success of execution of the test case. If the data is right, they can mark execution of the test case as successful. If the data is wrong, it means execution of the test case has failed and they would like to rollback changes in a data table to its original state. Conventionally, the testers execute structured query language (SQL) queries manually on the test database in order to find the changes made in the test data. While executing the queries, the testers utilize table viewers provided by the database. One example is a SQLPLUS utility provided by Oracle. The table viewers are user interfaces or tools to view the test data in a tabular form. The table viewers provide the latest data in the database table without providing information on the latest changed values (so that a tester may perform a comparison between different states of the database or different test stages). Executing queries by using the user interfaces is a manual task and, at the same time, is time consuming thereby bringing in a possibility of errors.

Conventionally, one approach for test data versioning in database application development is based on long transaction management. The approach enables multiple logically consistent and mutually exclusive logical databases which are to be maintained simultaneously in the same database. In this approach, each developer works on their own long transaction and separates them from changes performed by others developers.

Further, long transaction is performed using low level versioning. A database table version is enabled by augmenting its key with a version number. The changes performed in the long transaction are tagged with version numbers that are unique to the long transaction. A view named VersionTree view is created on each version enabled table. In order to achieve this, an original table is renamed and the VersionView with the same name as that of the table is created. Long transaction approach creates new entities in the database in order to create a logical database which increases data in a test environment. Further, the long transaction approach is specific for certain type of databases.

Further, the testers spend time in verifying the data change in the test database after test execution. In order to compare the data after execution with the original data, the testers have to perform manual tasks. In addition, during verification processes, the testers may find issues in the modified data in the database because of the errors present in the application that require rerunning of the application after the error is fixed. In such case when the developers have to test using the original data instead of the data resulting from the previous round of testing, rerunning of the application is not possible because original data stage is not saved. Further, the original data stage is a first stage while testing the data. In such cases, the developers have to perform manual tasks in order to revert to original data stage for running the test case. The manual tasks so performed are time consuming and may lead to inaccuracy. Because of the absence of comparison between the old data and the new data at the time of test execution, some critical changes may get missed due to manual comparison and analysis, and this will result in errors.

The test case verification or accuracy evaluation is done by comparing the changes made by the application being tested during various test stages. The other approach used by the testers in order to verify the test case of the earlier stage is by fixing the improper data manually or refreshing the test environment. Fixing the improper data manually is more prone to errors and refreshing of the test environment is time consuming. Refreshing of the test environment is an option, but that will take test data to its original stage. Testers may have to rerun all the test cases to get data into a stage where the last failed test case can be rerun. This can be time consuming.

Existing databases provide change in data in the form of log files. When a certain amount of data storage is logged in the log file the database logs into a next file to maintain various stages of the data. Further, the database facilitates reverting back to an identified stage as specified in the log file. In such cases, the developers do not have access to such log files.

SUMMARY OF THE INVENTION

This summary is provided to introduce concepts related to system and methods for creating one or more variants of test data during various test stages and the concepts are further described below in the detailed description. This summary is not intended to identify essential features of the claimed subject matter nor is it intended for use in determining or limiting the scope of the claimed subject matter.

In one implementation, a system for creating one or more variants of test data during various test stages is provided. The system comprises of a processor and a memory. The memory is coupled to the processor. The processor is configured to execute a set of programmed instructions stored in the memory. The memory comprises of a variant creation module configured to allow a user to create a primary variant for the test data and to store the primary variant of the test data in a test data variant repository. The memory further comprises of an identification module adapted to identify one or more changes in a test database during one or more test stages by using a tracking mechanism. The memory further comprises of a variant update module configured to allow the user to store the changes performed in the test database during one or more stages by creating one or more new variants with respect to the user's request. The tracking mechanism is performed by the user to compare variants, which includes comparing the latest variant with the test database data. If the user finds changes, the variant can be stored in the test data variant repository in the form of a new variant. The new variants are created in a manner such that the user may access the primary variant and the new variants so created to further perform a comparative analysis between two or more states of the test database. The user may further modify the test data by performing one or more modifications in the test database by reverting to the primary variant or the new variants at any test stage.

In one implementation, a method for creating one or more variants of test data at various test stages is provided. The method comprises of creating a primary variant for the test data and storing the primary variant of the test data in a test data variant repository. The method further comprises of identifying one or more changes in a test database during one or more test stages by using a tracking mechanism. The method further comprises of allowing the user to store the changes performed in the test database during one or more stages by creating one or more new variants with respect to the user's request. The tracking mechanism is performed by the user to compare variants, which includes comparing the latest variant with the test database data. If the user finds changes, the variant can be stored in the test data variant repository in the form of a new variant. The new variants are created in a manner such that the user may access the primary variant and the new variants so stored to further perform a comparative analysis between any two test states of the test database. The user may further modify the test data by performing one or more modifications in the test database by reverting to the primary variant or the new variants at any test stage. The creating, the identifying, and the allowing are performed by a processor.

In another implementation, a computer program product having embodied thereon a computer program for creating one or more variants of test data at various test stages in a test database is disclosed. The computer program product comprises of a program code for creating a primary variant for test data and storing the primary variant of the test data in the test data variant repository. The computer program product further comprises of a program code for identifying one or more changes in the test database during one or more test stages by a tracking mechanism. The computer program product further comprises of a program code for allowing the user to store the changes performed in the test database by creating one or more new variants with respect to the user's request. The tracking mechanism is performed by the user to compare the variants, which includes comparing the latest variant with the test database data. If the user finds changes, the variant can be stored in the test data variant repository in the form of a new variant. The new variants so created are stored in a manner such that the user may access the primary variant and the new variants so stored to further perform a comparative analysis between any two states of the test database. The user may further modify the test data by performing one or more modifications in the test database by reverting to the primary variant or the new variants at any test stage.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION OF THE INVENTION

Systems and methods for creating one or more variants of test data are described. The primary test data variant (referred to as the "primary variant" or the "baseline variant") is created by a user and the primary test data variant is stored as a baseline of the test data in a test data variant repository. The baseline is stored the first time the test data is created in the test database. The primary variant is stored as variant 1.0 of the test data. Then, the application is executed against the test database. Any changes made to the test database during the execution of the application are considered a variant change in the test database. The user analyzes the changes performed in the test database and requests for storing new variants in the test data variant repository. The changes are stored in the variants with names such as variant 1.1 and so on. Further, any subsequent change to the test database can be stored to the test data variant repository by the tester by changing a current variant. The new variants are stored and are named as 1.2, 1.3 and so on respectively. The new variants are only stored when a user requests to store such new variants.

The system and methods of the invention facilitate the user to store one or more variants of test data at various stages during testing. Further, the system and methods allow the user to compare the variants. If the test data is uncertain due to the errors present in the application, the user may revert to any variant so created to store the changes done by the user in the test database. By this, the user may revert to any state of the test database. The user may even revert to the original state of the test database by accessing the primary variant. The new variants created represent various states of the test database.

While aspects of the described system and methods for creating one or more variants of test data at various test stages may be implemented in any number of different computing systems, environments, and/or configurations, the embodiments are described in the context of the following exemplary system.

Figure 1:
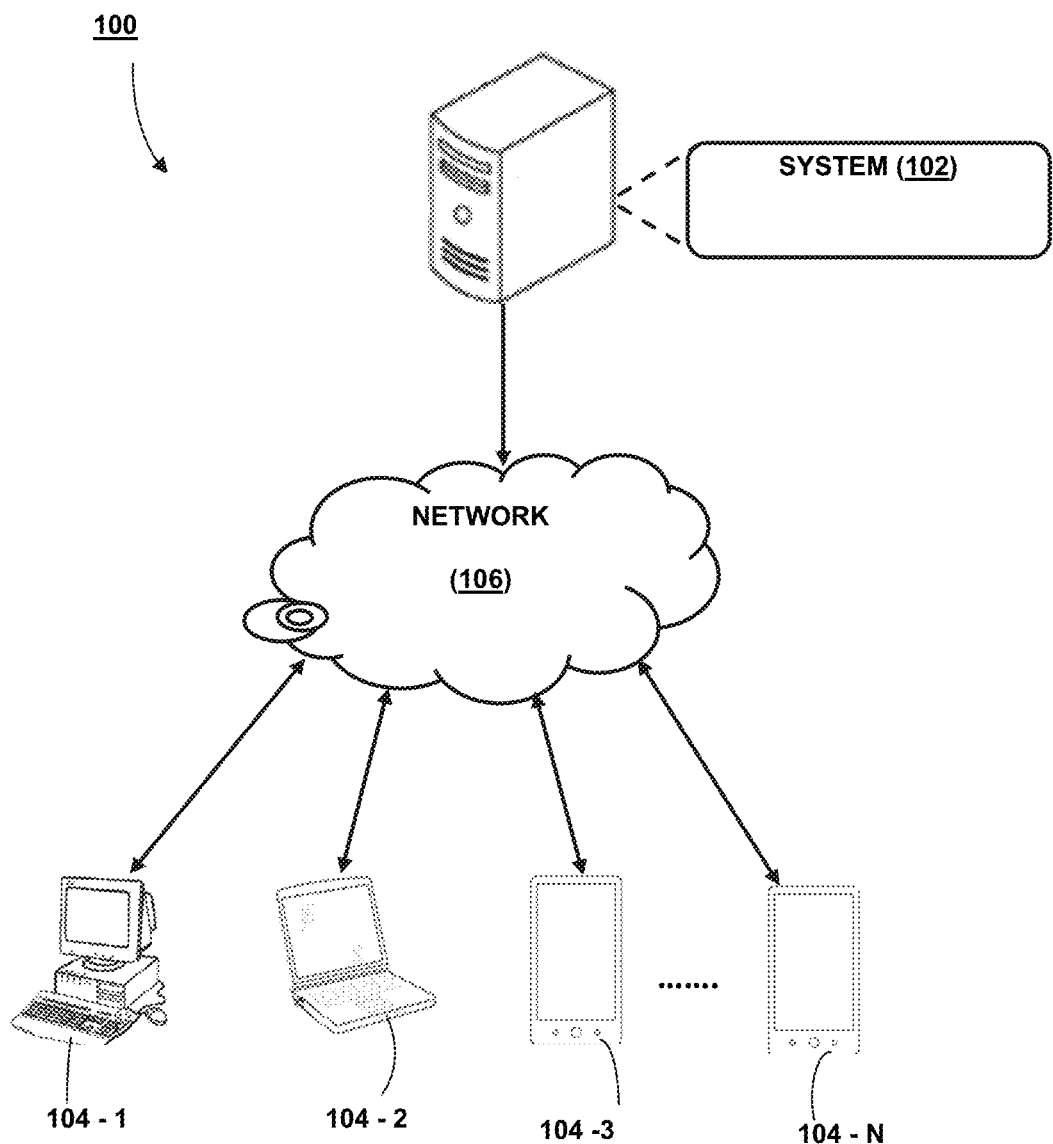
FIG. 1 illustrates a network implementation of a system for creating one or more variants of test data, in accordance with an embodiment of the present subject matter.
Figure 2:
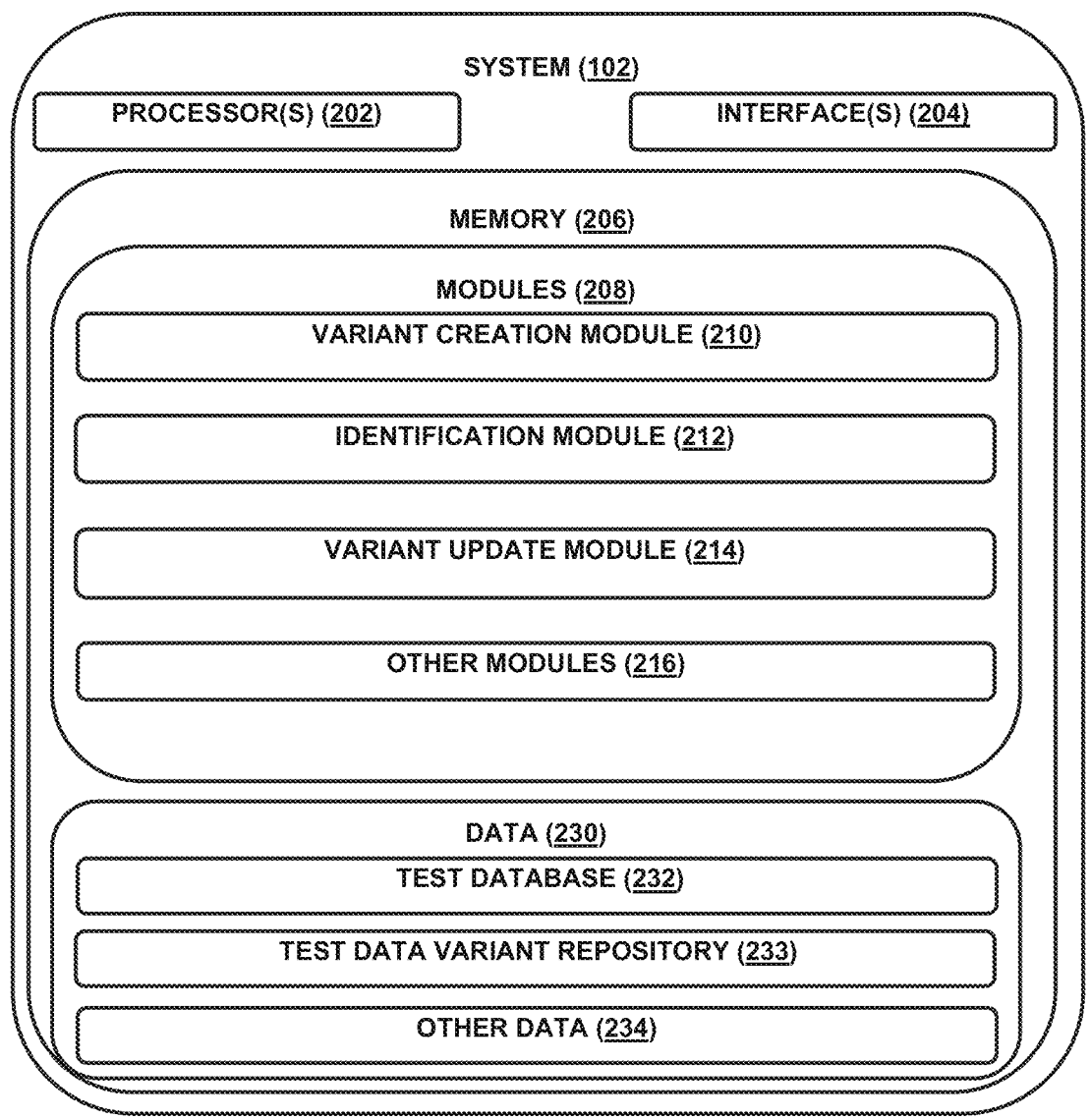
FIG. 2 illustrates the system, in accordance with an embodiment of the present subject matter.

Referring now to FIG. 1, a network implementation 100 of a system 102 for creating one or more variants of test data at various test stages is illustrated, in accordance with an embodiment of the present subject matter. In one embodiment, the system 102 provides a user to create a primary variant for test data. The primary variant of the test data is stored in the test data variant repository 233 (FIG. 2).

The system 102 facilitates in identifying one or more changes in the test database by using a tracking mechanism. The changes to the test database are stored as the new variants. The changes are only stored when a user requests for such storage and creation of new variants. The new variant is stored with a new variant number. The new variants store the changes performed in the test database performed by the user. The user may further access the primary variant and the new variants and may perform a comparative analysis. The user may perform a modification in the test data to any of the variants at any state of the test database during any test stage.

Although the present subject matter is explained by considering a scenario that the system 102 is implemented as an application on a server. It may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2, 104-3 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a variant creation module 210, an identification module 212, a variant update module 214, and other modules 216. The other modules 216 may include programs or coded instructions that supplement applications and functions of the system 102.

The data 230, amongst other things, serves as a repository for storing data processed, received, and generated by one or more of the modules 208. The data 230 may also include a test database 232, a test data variant repository 233 and other data 234. The other data 234 may include data generated as a result of the execution of one or more modules in the other module 216.

Figure 3:
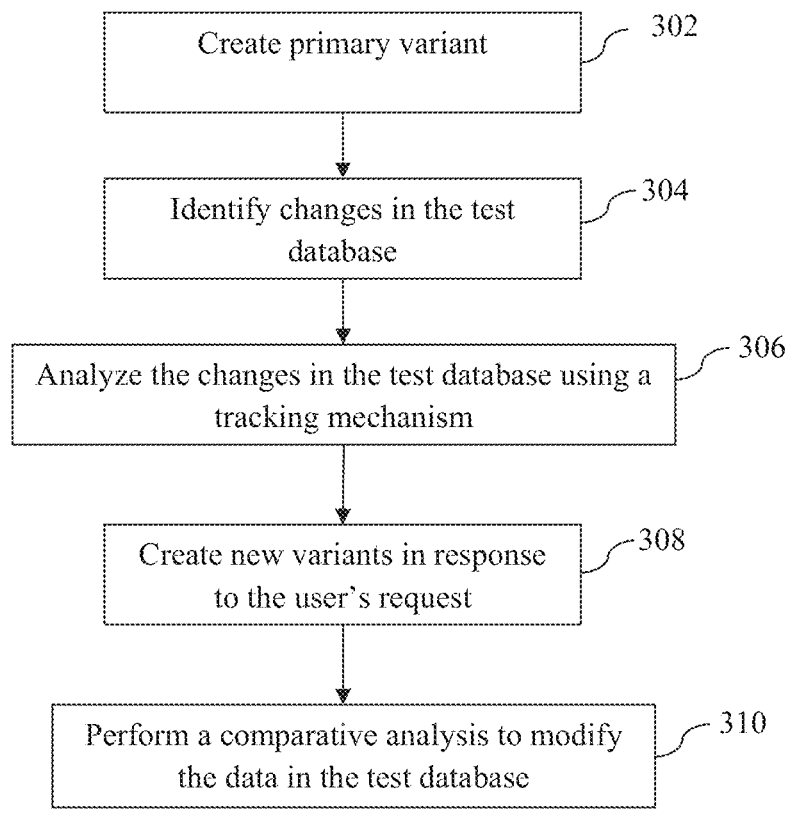
FIG. 3 illustrates a method for creating one or more variants of test data, in accordance with an embodiment of the present subject matter.

In one embodiment of the invention, referring to FIG. 2 and FIG. 3, the variant creation module 210 is configured to allow the user to create a primary variant (step 302) for the test data. The primary variant is a baseline of the test data. The baseline is created when test data is created for the first time in the test database 232. The primary variant so created is then stored in the test data variant repository 233. The primary variant is created for the entire test database 232.

When the baseline (primary variant) is created, the data is copied into one or more flat files and the baseline is stored in the test data variant repository 233. The baseline is marked as the primary variant with a number 1.0 in the test database 232. Further, the test data in the tabular form is stored in the flat files to the test data variant repository 233. Marking the primary variant with a number or alphabetical order is well understood by those persons skilled in the art and it is not intended to limit the scope of the invention.

In another embodiment of the invention, the system 102 comprises the identification module 212 adapted to identify the changes in the test database 232 (step 304) during one or more test stages by using a tracking mechanism. Further, the system 212 comprises the variant update module 214 configured to store the changes performed in the test database 232 (step 306). The changes are stored in new variants created upon the request of the user The variant update module 214 is further configured to store one or more new variants with respect to the user's request (step 308). The new variant is stored with a new variant number. The new variant stores the changes so performed by the user. The user may access the primary variant and the new variants to further perform a comparative analysis at any states of the test stage (step 310). The user may further modify the test data by applying one or more modifications at any time during the test stage (step 310).

The baseline of all the tabular form in the test database 232 is selected and a set of flat files is created with respect to each of the tabular forms. The user may change the data in to one or more of the tabular forms stored in the test database 232 and may create new variants with respect to those changes. The new variant is stored and provided with a different variant number when requested by the user. When the change to the data is performed after the creation of the baseline variant (the primary variant) in the test database 232, the new variant may be updated to as variant 1.1 when a user requests to save the changes as the variant 1.1. Further changes to the test database 232 are marked as variant 1.2 and so on if the user requests to save the changes so performed at any stage of the testing. Subsequent changes to the tabular forms are committed to new variants and the new variants are stored in the test data variant repository 233.

In one embodiment, the primary variant may be created when test data is created for the first time in the test database 232. Further, at any time during the testing, the user may consider any of the variants as the primary variant and can store incremental changes as new variants. Further, marking the new variant with a consecutive number, or random number, or alphabetical order is well understood by those persons skilled in the art and should not be taken in a limiting sense.

In one embodiment, the incremental changes to the test database 232 are stored in the test data variant repository 233. The incremental changes may include insert, update and delete. The corresponding changes in the flat files in the test database 232 in the form of the incremental changes may be performed separately for insert, update and delete operations during changes to the data. The user then creates a different new variant in the test data variant repository 233 to save the incremental changes so performed by the user.

Figure 4:
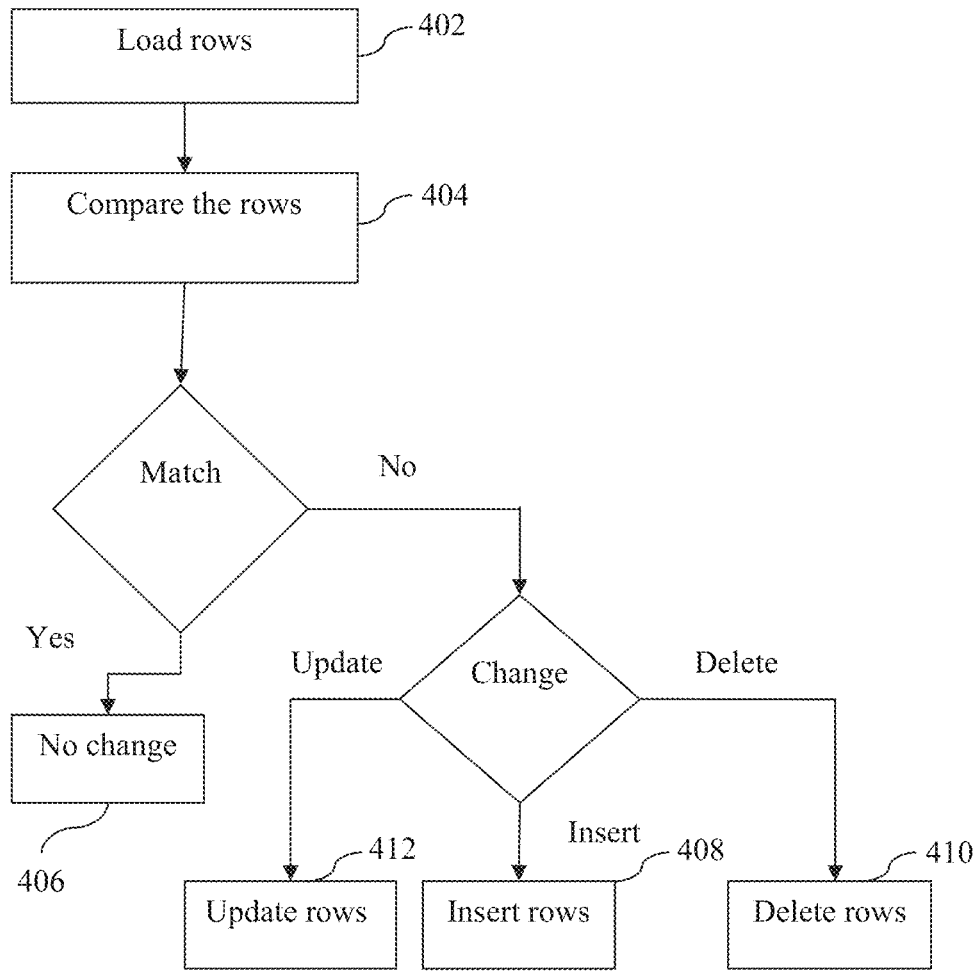
FIG. 4 illustrates incremental changes performed in one or more variants of test data, in accordance with an embodiment of the present subject matter.

In one embodiment of the invention, the incremental changes are detailed with respect to FIG. 4. The incremental changes at any state of the test database 232 are performed by comparing the data in tabular form and the baseline flat file or using data in a precedent variant.

Further, the incremental changes are performed by loading rows (step 402) of the tabular form of the variant in the memory 206 of the system 102. The incremental changes are identified by the tracking mechanism. Each row in the test database table data is compared with a corresponding row in a latest variant (step 404). Whenever a row is exactly identical it is ignored (step 406). Whenever a row is not found in the latest variant it is considered an insert record. Whenever a row is not found in the test database, it is considered a deleted recorded. Whenever a record is found, but few column values are modified, it is considered an update record. These updated records are stored in the new variant when a user requests for it.

One or more modifications at any time during the test stage is performed in the test database 232. The changes in the modification of the data are identified by using the tracking mechanism to find whether the changes performed are inserted or deleted in the test database 232. If the change performed is by way of updating data in a row, then the new variant, when created with respect to the user's request, is stored as updated rows in the new variant in the test data variant repository 233.

Further, if the change is performed by way of inserting data in the row of the test data stored in the test database 232, the new variant may then be stored as inserted rows (step 408) in the new variant in the test data variant repository 233. The new variant is stored in response to the user's request.

Further, if the change is performed by way of deleting data in the row of any new variant, another new variant is stored as deleted rows (step 410) in the test data variant repository 233 in response to the user's request.

Further, if the change is performed by way of updating data in the row of any new variant, another new variant is stored as updated rows (step 412) in the test data variant repository 233 in response to the user's request.

In another embodiment of the invention, the user may revert to any of the new variants stored in the test data variant repository 233. By this the user may revert to any of the states of the test database 232. The user may further modify the test data in the test database 232 by accessing any new variant. The user may even access the primary variant and may revert to the original state of the test database 232 during any test stage.

The system 102 generates a script for tabular form in order to revert to any state of the test database 232 by accessing the new variants in the test data variant repository 233. The system 102 generates the script for selected tabular forms to be reverted. The script is presented to the user on the interface 204 and the user may execute the script by inputting the required query based on the data to be reverted. The script may comprise queries including but not limited to insert, update and delete.

In one implementation, the system 102 may comprise removing the baseline variant. Removing the baseline variant may remove all the variants corresponding to the baseline variant. Further, the new variants and the incremental changes made in the test database 232 may also be removed in response to the user's request.

In another embodiment, the system 102 facilitates the user in performing the comparative analysis in order to compare two or more stages of the test data or two or more states of the test database 232. By accessing any of the variants, the user may revert to any state of the test database 232.

Further, the comparative analysis may comprise comparing the test data present in the test database 232 and new variant is performed by the user. Representation of the latest version is shown using the interface 204.

The user may revert to any of the variants and may compare the variants stored in the test data variant repository 233. Thus, the user may compare one or two states of the test database 232 during any test stage. In one embodiment, the user may add comments and tag the comments to each change of the data to find information related to each variant.

If the test database 232 includes data constraints such as a foreign key and/or a primary key which are added to the test database 232, the system 102 does not allow the data constraints to be added to the test data variant repository 233. If the data constraints are present in the test database 232, the user may revert to the baseline variant at anytime such that the user may refer to the baseline variant for integrated data in the test database 232. The step of revert so performed by the user is done to get required variant data into a table. If the database has defined constraints and they are getting violated because of revert, revert will fail. It is possible in some cases that testers, during a revert process, can make data inconsistent and unusable for testing. In that case, the only way to come out is to revert to the primary variant.

Figure 5:
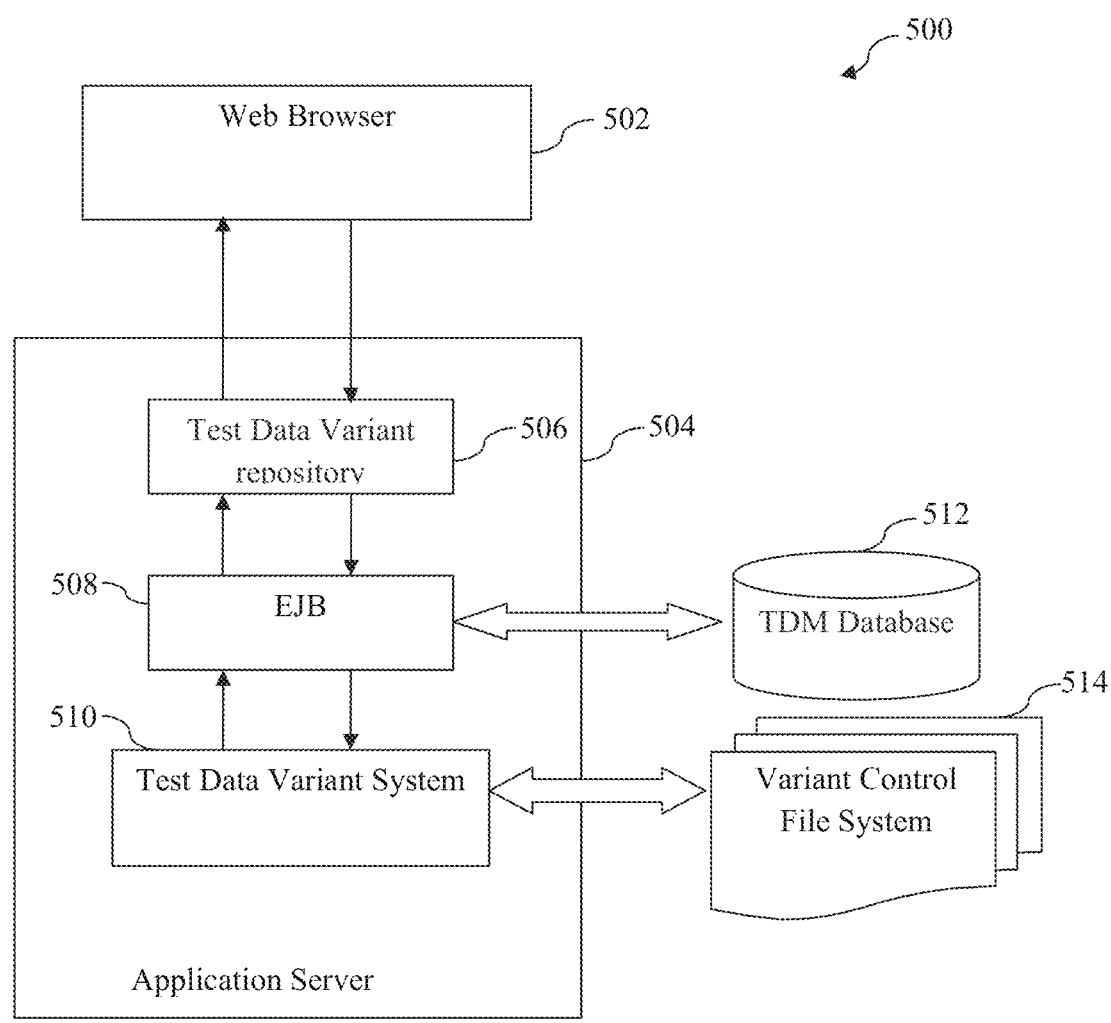
FIG. 5 illustrates architecture of the test data variant in a web based system, in accordance with an embodiment of the present subject matter.

In one embodiment, architecture of the test data variant in a web based system 500 is as shown in FIG. 5. The test data variant runs on an application server 504 which comprises a test data variant repository 506, an Enterprise JavaBeans (EJB) 508 and a Test Data Variant System 510. The application server 504 is accessed by a web browser 502. Repository for variants is stored in the test data variant repository 506. In one implementation, Enterprise JavaBeans (EJB) interacts with a test data management (TDM) database 512 and the Test Data Variant System 510 interacts with the Variant Control File System 514 in order to store incremental changes that are made in Test Data Variant System 510.

In an exemplary embodiment, the system 102 creates the baseline variant (primary variant) in the test data variant repository 506. Any change in the baseline variant is marked as variant 1.0 (new variant). Subsequent change to the test database 232 is marked as the new variant 1.1 and so on in response to the user's request. The system 102 is explained by way of an example.

Considering a baseline variant having the following data in a tabular form as shown below:

| Id | Name | Address | Designation |
|---|---|---|---|
| 100 | John | Baker Street | Supervisor |
| 101 | Greg | Chapel Street | Operator |
| 102 | Mary | Brook Street | Typist |

For the above data, the baseline is created and the flat file is created and is stored in the test data variant repository 506. The variant of the tabular form is set as 1.0.

The baseline is stored in the test data variant repository 506 as "employee_1_0.dat"
  a. 100,John.BakerStreet, Supervisor
  b. 101,Greg,ChapelStreet,Operator
  c. 102,Mary,BrookStreet,Typist At the time of testing, the user may perform changes to the above data such as insert, edit or update or delete. Consider the following example where the user executing a test case changes the following data:
  Designation of employee Greg gets changed from Operator to Supervisor.
  Data of employee Mary gets deleted
  Data of employee Diana gets inserted Thus, the data in the tabular form now includes the data shown below, which reflects the changes identified above:

| Id | Name | Address | Designation |
|---|---|---|---|
| 100 | John | Baker Street | Supervisor |
| 101 | Greg | Chapel Street | Supervisor |
| 103 | Diana | Arthur Street | Clerk |

The user stores the stage of the above tabular form by committing changes to the variant. The commit changes are stored and analyzed by the user in the test data variant repository 506. The tracking mechanism is performed to store a new variant along with the variant number with respect to the changes performed in the preceding variant. The new variant will only be stored in response to the user's request. Incremental changes to the test database 232 so stored are shown below:
  a. Employee_1_1_insert.dat
  103,Diana,ArthurStreet,Clerk The row in the tabular form which is inserted is stored in the new variant in the test data variant repository 506. Similarly, for the above data, the deleted data and updated data are stored as shown below:
  a. Employee_1_1_delete.dat
  102,Mary,BrookStreet,Typist
  and changes in existing data are saved as below.
  Employee_1_1_Update.dat
  101,1,3,Operator:Supervisor In the updated data, "101,1,3,0perator:Supervisor", 101 indicates key value, 1 indicates number of changes in the row i.e. 1. The column that is changed is 3. In one embodiment, the first column is considered as the $0^{th}$ column. Further, the original value and the changed value are separated by a colon (:).

Similarly, the users may store the stage of the tabular form during testing. Each stage stores only the incremental changes in the new variant in response to the user's request.

Further, if the changes are performed to the above example, where the test changes the address of John to Oxford, the following variant is created.
  Employee_1_2_Update.dat
  100,1,2,BakerStreet:Oxford As shown, each stage of the tabular form during the testing is stored in the test data server.

The user may further perform the comparative analysis to modify the test data by applying one or more modifications at any time during the test stage. Further, the users may compare any of the two variants in order to verify the data that facilitates the users in the test case verification.

Considering the above example where the stage of the variant is variant 1_2, if the user requires reverting to variant 1_0, a script is generated comprising a query which is to be executed in the sequence as presented below:

The data of employee 'Diana' is to be deleted in order to revert to the tabular form stage as of the variant 1_0. In the query which is generated, a 'where' clause is formed using key value of the data to be inserted.

Delete from Employee where Id=103
and for the data employee 'Mary' required to be reverted using insert query Insert into Employee (Id,Name,Address,Designation) values (102,'Mary','Brook Street','Typist')

Update for the data employee 'Greg' and 'John' required to be reverted using update queries is shown as below update Employee set Designation='Operator' where Id=101
update Employee set Address='Baker Street' where Id=100

Where clause of the query is formed using key value of updated data. Further, column name is identified using column index specified original value of the changed and original value is used to update data.

The foregoing description of illustrated embodiments of the present invention, including the abstract, is not intended to limit the invention to the precise forms disclosed herein. The specific embodiments of the invention are described herein for illustrative purposes only, various equivalent modifications are possible within the scope of the present invention to those skilled in the art.

What is claimed is:

1. A system for creating one or more variants of test data during various test stages, the system comprising:
  a processor;
  a memory coupled to the processor, the processor configured to execute a set of programmed instructions stored in the memory, the memory comprising:
    a variant creation module to
      create a primary variant for the test data stored in a test database comprising one or more flat files, wherein the test data comprises data corresponding to at least one test case; and
      store the primary variant of the test data in a test data variant repository in a tabular form, and wherein the primary variant created is copied into the one or more files; and
    an identification module to
      execute the test data in the test database to identify one or more types of changes made to the test data;
      compare a row of the test data having one variant with a corresponding row of the test data having another variant stored in the test data variant repository in the tabular form, wherein the one variant comprises one of the primary variant and a new variant, and wherein another variant comprises the new variant;

identify one or more types of changes in the test data of the test database based on the comparison, during one or more test stages, by using a tracking mechanism, wherein the tracking mechanism compares the data in rows of tabular form with the one variant to the another variant; and a variant update module to store the corresponding one or more types of changes identified in the test database of the test data during the one or more test stages by creating and storing one or more new variants for the corresponding one or more types of changes in the test data variant repository in response to a request received by a user and identify corresponding one or more types of changes in the one or more flat files in the test database separately and in parallel to the corresponding types of changes in the test data;

perform a comparative analysis between two or more states of the test database by accessing the primary variant and the one or more new variants, wherein the two or more states of the test database comprise an original state and a changed state;

modify the test data in the test database by reverting to one of the primary variant and the one or more new variants during the one or more test stages, wherein if the test data is undetermined due to errors in the application then the user reverts to a variant created to store types of changes in the test database, wherein modification of the test data generates a script and displays, using the script, to the user an option to revert to any of the new variants in the test data variant repository; and perform one or more modifications at the one or more test stages to further modify the test data and compare any of the two variants to verify the test data for facilitating in the at least one test case verification, wherein each of the one or more modifications are tagged with one or more comments to the corresponding one or more types of changes to obtain information associated with each of the one or more new variants.

2. The system of claim 1, wherein the primary variant comprises a baseline version of the test data as of a date upon which it was created.

3. The system of claim 1, wherein the variant creation module stores the primary variant in tabular form and creates a set of flat files for association with the tabular form.

4. The system of claim 1, wherein the identification module identifies types of changes to the test data in an incremental form in tabular form.

5. The system of claim 1, wherein the script includes one or more queries, wherein the queries include insert data, update data, delete data, and combinations thereof.

6. The system of claim 1, wherein the comparative analysis is performed between any two stages by comparing the primary variant with the new variants, or two or more different new variants, or a combination thereof.

7. A computer implemented method for creating one or more variants of test data during various test stages, the method comprising:

creating a primary variant for the test data stored in a test database comprising one or more flat files, wherein the test data comprises data corresponding to at least one test case;

storing the primary variant of the test data in a test data variant repository in a tabular form, and wherein the primary variant created is copied into the one or more files; and executing the test data in the test database to identify one or more types of changes made to the test data;

comparing a row of the test data having one variant with a corresponding row of the test data having another variant stored in the test data variant repository in the tabular form, wherein the one variant comprises one of the primary variant and a new variant, and wherein another variant comprises the new variant;

identifying one or more types of changes in the test data of the test database based on the comparison during one or more of the test stages using a tracking mechanism, wherein the tracking mechanism compares the data in rows of tabular form with the one variant to the another variant; and storing the corresponding one or more types of changes identified in the test database during the one or more test stages by creating and storing one or more new variants for the corresponding one or more types of changes in the test data variant repository in response to a request received by a user and identify corresponding one or more types of changes in the one or more flat files in the test database separately and in parallel to the corresponding types of changes in the test data;

performing a comparative analysis between two or more states of the test database by accessing the primary variant and the one or more new variants, wherein the two or more test states of the test database comprise an original state and a changed state;

modifying the test data in the test database by reverting to one of the primary variant and the one or more new variants during the one or more test stages, wherein if the test data is undetermined due to errors in the application then the user reverts to a variant created to store types of changes in the test database, wherein modification of the test data generates a script and displays, using the script, to the user an option to revert to any of the new variants in the test data variant repository; and performing one or more modifications at the one or more test stages to further modify the test data and compare any of the two variants to verify the test data for facilitating in the at least one test case verification, wherein each of the one or more modifications are tagged with one or more comments to the corresponding one or more types of changes to obtain information associated with each of the one or more new variants.

8. The method of claim 7, wherein the primary variant comprises a baseline version of the test data as of a date upon which it was created.

9. The method of claim 7, wherein creating the primary variant is performed in data present in tabular form and further creating a set of flat files for association with the tabular form.

10. The method of claim 7, wherein identifying the one or more types of changes includes identifying types of changes in incremental form to the data in rows of the tabular form.

11. The method of claim 7, wherein generating the script comprises creating one or more queries, wherein the queries include insert data, update data, delete data, and combinations thereof.

12. The method of claim 7, further comprising updating, at the user's request, a variant number assigned to the primary variant or a new variant when a change is performed thereto.

13. The method of claim 7, wherein comparatively analyzing includes comparing the primary variant with any one new variant, or two new variants, or a combination thereof from any two different stages.

14. A computer program product having a non-transitory computer readable storage medium having a computer program stored thereon for creating one or more variants of test data at various test stages in a test database, the computer program product comprising:
- a computer readable program code for creating a primary variant for the test data stored in a test database comprising one or more flat files, wherein the test data comprises data corresponding to at least one test case;
- a computer readable program code for storing the primary variant of the test data in a test data variant repository in a tabular form, and wherein the primary variant created is copied into the one or more files; and
- a computer readable program code for executing the test data in the test database to identify one or more types of changes made to the test data;
- a computer readable program code for comparing a row of the test data having one variant with a corresponding row of the test data having another variant stored in the test data variant repository in the tabular form, wherein the one variant comprises one of the primary variant and a new variant, and wherein another variant comprises the new variant;
- a computer readable program code for identifying one or more types of changes in the test data of the test database based on the comparison during one or more of the test stages using a tracking mechanism, wherein the tracking mechanism compares the data in rows of tabular form with the one variant to the another variant; and
- a computer readable program code for
  - storing the corresponding one or more types of changes identified in the test database during the one or more test stages by creating and storing one or more new variants for the corresponding one or more types of changes in the test data variant repository in response to a request received by a user and identify corresponding one or more types of changes in the one or more flat files in the test database separately and in parallel to the corresponding types of changes in the test data;
  - performing a comparative analysis between two or more states of the test database by accessing the primary variant and the one or more new variants, wherein the two or more test states of the test database comprise an original state and a changed state;
  - modifying the test data in the test database by reverting to one of the primary variant and the one or more new variants during the one or more test stages, wherein if the test data is undetermined due to errors in the application then the user reverts to a variant created to store types of changes in the test database, wherein modification of the test data generates a script and displays, using the script, to the user an option to revert to any of the new variants in the test data variant repository; and performing one or more modifications at the one or more test stages to further modify the test data and compare any of the two variants to verify the test data for facilitating in the at least one test case verification, wherein each of the one or more modifications are tagged with one or more comments to the corresponding one or more types of changes to obtain information associated with each of the one or more new variants.

* * * * *